Patented Mar. 8, 1949

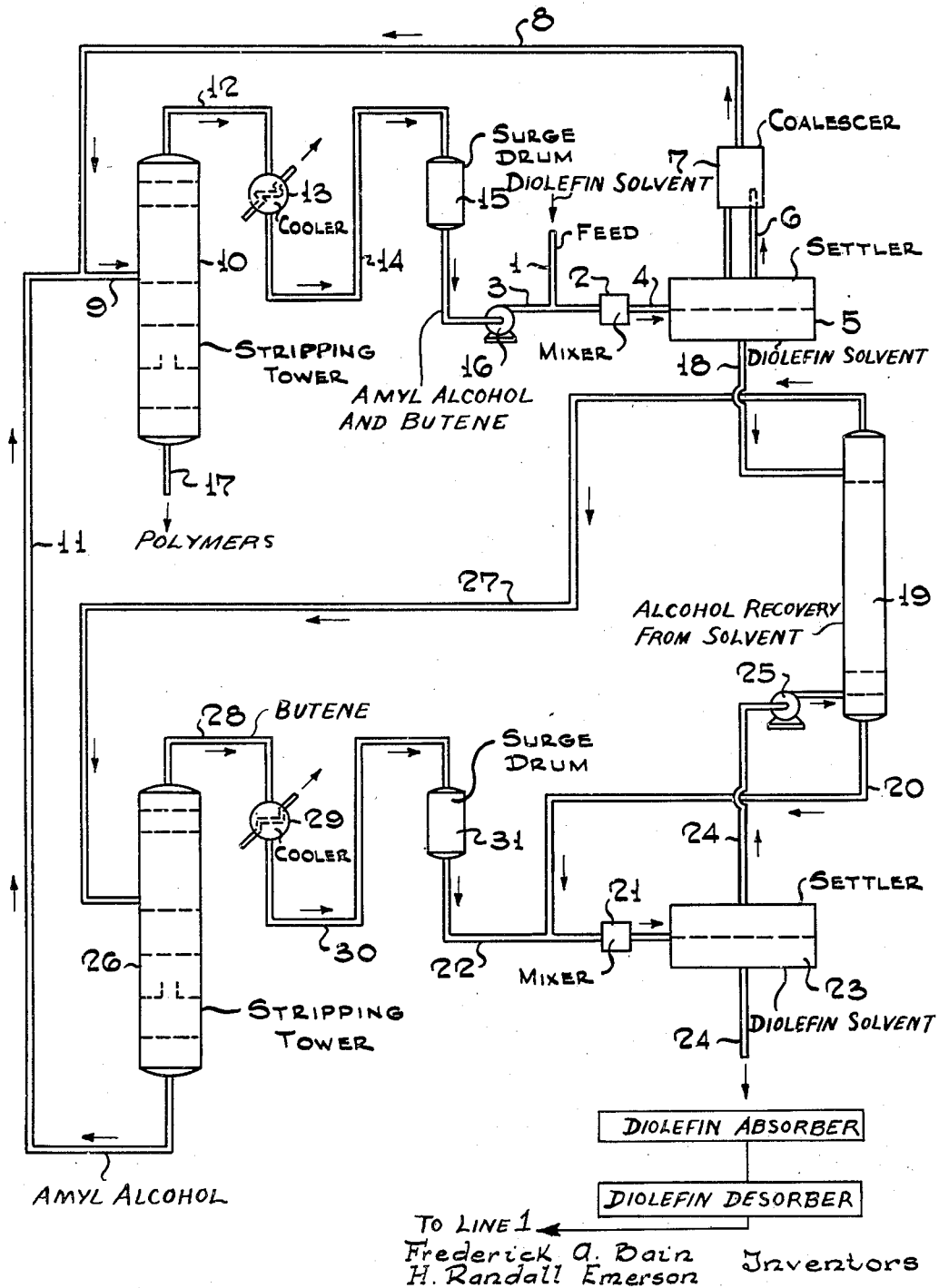

2,463,846

UNITED STATES PATENT OFFICE 2,463,846

PURIFICATION OF SOLVENT USED IN DIOLEFIN CONCENTRATION

Frederick A. Bain and Hibbard Randall Emmerson, Sarnia, Ontario, Canada, assignors to Standard Oil Development Company, a corporation of Delaware Application November 7, 1946, Serial No. 708,456

1 Claim. (Cl. 260—438)

This invention relates to improvements in the extraction and concentration of diolefins from mixtures of saturated and unsaturated hydrocarbons.

Diolefin fractions are generally obtained by dehydrogenating a hydrocarbon mixture, distilling to obtain fractions having the same number of carbon atoms per molecule, contacting the various resulting fractions with aqueous solvents to obtain solvents rich in the said diolefins, separating from the unabsorbed hydrocarbons and desorbing the diolefins by methods well known in the art. For example, it is common to pass a hydrocarbon mixture containing $C_4$ olefins over a dehydrogenating catalyst maintained at a temperature in the range of 1150° F. to 1300° F. to convert substantial amounts of the mono-olefin in the feed stock into butadiene. The resulting product from such a dehydrogenation step will include a diolefin, a mono-olefin, a diluent, such as the mono-olefin in the feed stock, and contaminants formed during the reaction. The $C_4$ fraction is then contacted with an aqueous solvent to concentrate the diolefins. An aqueous solution of cuprous ammonium acetate has been found commercially desirable as the solvent but other solvents, such as ammoniacal water, water, and aqueous solutions of silver nitrate, mercuric cyanide, cuprous chloride, etc. may also be employed for this purpose. The rich solvent is separated and desorbed to obtain butadiene. The separated butadiene is usually subjected to a fractionating distillation step to separate out hydrocarbon polymers. The solvent employed in the extraction stage is recovered and recycled, for if this solvent is not recovered, the cost of operation is too high to make the process commercially profitable.

It is known that the contaminants which include appreciable amounts of acetylenes such as methyl, ethyl and vinyl acetylenes, are also absorbed in the solvent and generally steps are taken to avoid the desorption of these contaminants with the diolefin for the presence of acetylenes and their polymers in butadiene is undesirable. These contaminants are retained in the solvent and it is necessary that they be removed from the solvent before it is recycled and used again in the absorption of other diolefins. The presence of the contaminants in the solvent generally leads to loss in plant capacity due to entrainment and emulsion in the liquid-liquid stage settlers where the unabsorbed hydrocarbons and the solvent are separated and also foaming in vapor liquid absorber and in desorber.

The contaminants are generally found to be oily polymers or condensation products which are appreciably water soluble and build up in the solvent.

An object of this invention is to remove the contaminants generally found in the solvents that have been used in the extraction of diolefins and are to be recycled after the separation of the diolefin for further absorbing diolefins.

It was found that use of a mixture of amyl alcohol and butene is useful in removing these foam and emulsion producing agents from the used absorption solution.

This will be more clearly understood on reading the following description with reference to the drawing which is in the form of a diagrammatic flow sheet. The solvent in this case, for example, cuprous ammonium acetate which had been used to absorb a diolefin and from which the diolefin had been separated, is passed through inlet pipe 1 into a mixing chamber 2 together with a mixture of amyl alcohol and butene which is introduced into the mixer by means of pipe 3. Other alcohols may be used such as iso-amyl alcohol, fusel oils and 2-ethyl butanol, and other light hydrocarbon fractions having not over four carbon atoms to the molecule. The mixture of alcohol, butene, and cuprous ammonium acetate is then passed through pipe 4 into settling chamber 5 where a two-layer separation is obtained. The upper layer of separated alcohol and butene together with polymers is passed by means of pipe 6 into a coalescer 7 to remove small traces of entrained cuprous ammonium acetate. The alcohol and butene plus polymers is passed from the coalescer into pipe 8 and flows into pipe 9 where it enters a stripping tower together with recovered alcohol from pipe 11. The alcohol and butene are distilled overhead through pipe 12 and recycled through condenser 13, pipe 14, surge drum 15 and pump 16 to pipe 3. The polymers are removed from stripping tower by means of pipe 17.

The bottom layer in settling chamber 5 composed mainly of cuprous ammonium acetate is removed by means of pipe 18 to a wash tower 19 where it is scrubbed with a butene stream to remove traces of alcohol. The cuprous ammonium acetate is removed from the bottom of the wash tower through pipe 20 and introduced into a mixing chamber 21 along with a butene stream from pipe 22. The mixture of cuprous ammonium acetate and butene is passed to settler 23, and the cuprous ammonium acetate is removed through the bottom pipe 24 and recycled for further absorption of butadiene. The upper layer in settler 23 consisting of butene with a small percentage of alcohol is removed through pipe 24 passed through pump 25 to the bottom of wash tower 19. The butene is removed from the top of tower 19, after washing the cuprous ammonium acetate stream countercurrently, and is fed to the butene stripper tower 26 through pipe 27. The alcohol is stripped out of the butene and removed from the stripper bottom to be recycled via pipe 11 to pipe 9. The butene is taken overhead through pipe 28, condensed in condenser 29, passed through line 30 and drum 31 back to pipe 22.

This example is given for the extraction and concentration of butadiene but the process using cuprous amine solution is also applicable for the separation and concentration of other conjugated diolefins such as isoprene, piperylene, hexadiene and the like from cracked petroleum fractions containing such diolefins.

The concentration of the amyl alcohol-butene stream may be varied depending on the solvent to be contacted for polymer removal. In systems where the solubility of the solvent in the alcohol is high larger concentrations of butene are advantageous. For example, the use of pure amyl-alcohol alone to contact cuprous ammonium acetate solution results in contamination of the alcohol with ammonia and copper which must be removed by additional equipment. The particular concentration of alcohol butene stream for a given solvent is dependent upon mutual solubility characteristics of the solvent and alcohol. The amount of alcohol necessary is also materially reduced when employing butene along with amyl-alcohol. This process is particularly adaptable for cleaning the cuprous ammonium acetate solvent employed in the extraction and purification of butadiene. Other alcohols which may be used are iso-amyl alcohol, fusel oils and 2-ethyl butanol. Other low boiling hydrocarbons having not more than four carbon atoms to the molecule may be used as substitutes for butene.

We claim:

The method of purifying an aqueous cuprous ammonium acetate solvent used for extraction of butadiene from a hydrocarbon mixture containing olefins and acetylenes, said solvent being contaminated by polymers of acetylenes and water-soluble foaming contaminants, which comprises mixing the contaminated aqueous solvent with a higher alcohol having at least 5 carbon atoms per molecule and with liquid butene for extracting said contaminants from the solvent, separating a liquid phase consisting of the alcohol and of liquid butene with contaminants extracted therein from the aqueous solvent, washing the thus separated aqueous solvent with additional liquid butene to remove remaining traces of the alcohol therefrom, and recycling the alcohol thus removed to the extraction step.

FREDERICK A. BAIN.
HIBBARD RANDALL EMMERSON.

REFERENCES CITED

The following references are of record in the file of this patent:

UNITED STATES PATENTS

| Number | Name | Date |
| --- | --- | --- |
| 2,383,784 | Fleer | Aug. 28, 1945 |
| 2,397,996 | Wilson | Apr. 9, 1946 |
| 2,399,882 | Morrell et al. | May 7, 1946 |